March 14, 1961  J. C. GILES  2,974,360

SLAB MOLDING MACHINE

Filed June 7, 1957

INVENTOR.
J. C. GILES
BY *Jerry J. Dunlap*
ATTORNEY

2,974,360
SLAB MOLDING MACHINE

John C. Giles, Ponca City, Okla., assignor to Continental Oil Company, Ponca City, Okla., a corporation of Delaware Filed June 7, 1957, Ser. No. 664,344

3 Claims. (Cl. 18—4)

This invention relates generally to improvements in machines for molding wax and the like, and more particularly, but not by way of limitation, to an improved conveyor system for use at the discharge end of a wax molding machine or the like.

In the usual wax molding machine, the wax is injected into open-top molds in liquid form so that the wax will solidify in the molds in the form of substantially rectangularly shaped slabs. During cooling and solidification of the wax, the top edges of a wax slab tend to extend higher than the remainder of the slab to form what are commonly known as feather edges. The feather edges are formed because of early solidification of the outer layers of the liquid, and the over all shrinkage during the solidification of the total body of the liquid. Such feather edges are a hindrance in handling and transporting the slab after the molding operation. At the present time, however, no practical means has been found to remove the feather edges.

The present invention contemplates a novel apparatus interposed in the discharge conveyor system of a molding machine to automatically remove the feather edges of slabs being moved along the conveyor system, without removing any material from the slabs, other than the material forming the feather edges. More specifically, I contemplate interposing a heated plate in the conveyor system for contacting the sides of the slabs having the feather edges, whereby the feather edges are melted off to produce slabs flat on all sides and having uniform edges.

An important object of this invention is to provide slabs of wax and the like having uniform edges, whereby the slabs may be easily handled and transported.

Another object of this invention is to automatically remove the feather edges from slabs of wax and the like as the slabs are discharged from a molding machine.

A further object of this invention is to provide apparatus for removing feather edges from slabs of wax and the like, which apparatus is simple in construction and may be economically manufactured and operated.

A still further object of this invention is to increase the efficiency of present systems of slabbing wax and the like, without materially altering the systems.

Other objects and advantages of the invention will be evident from the following detailed description, when read in conjunction with the accompanying drawings which illustrate my invention.

Figure 1:
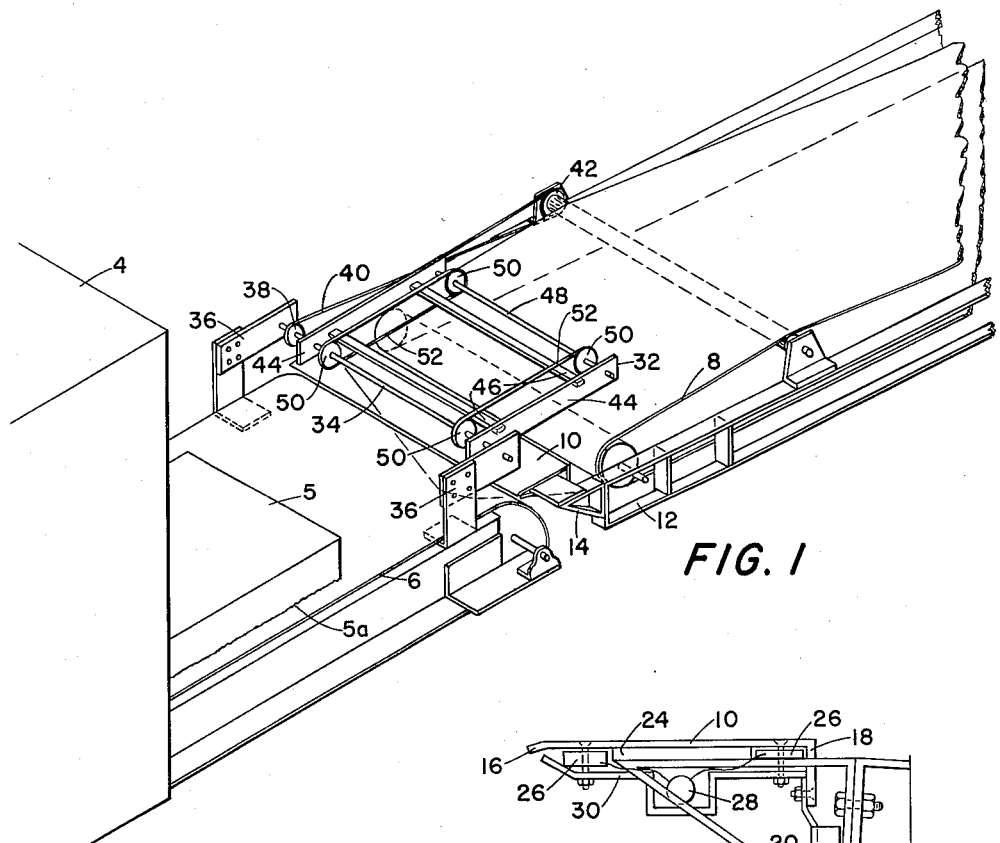
Figure 1 is a schematic perspective view of a wax slabbing system utilizing my novel apparatus for removing feather edges from the wax slabs.

Referring to the drawings in detail, and particularly Fig. 1, reference character 4 designates a machine for molding slabs of wax and the like. The machine 4 may be any one of the presently available slabbing machines which mold slabs of wax and the like 5 wherein the edges 5a of one side of the slabs protrude and form what are known as feather edges. A suitable conveyor 6 extends from the discharge end of the slabbing machine 4 substantially in a horizontal direction to discharge the slabs of wax 5 from the machine 4. Another conveyor 8 extends in tandem relation to the conveyor 6 for transporting the wax slabs on to a loading station, where the slabs can be stacked or loaded and transported in any desired manner. The conveyors 6 and 8 form the usual conveyor system extending from the discharge end of a slabbing machine. It will be understood, of course, that the conveyors 6 and 8 may be of any suitable type, such as slat or belt conveyors, so long as they will effectively transport the wax slabs from the machine 4.

Figure 2:
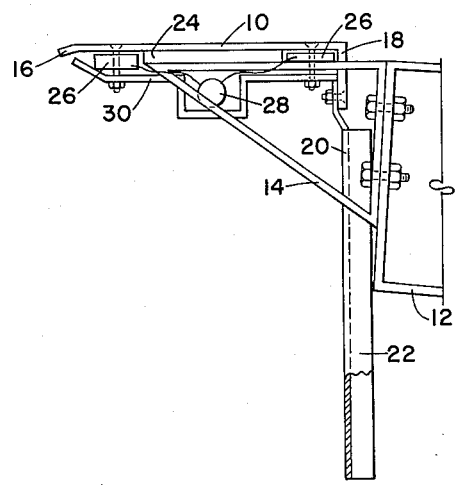
Figure 2 is an enlarged end view of the heated plate and associated parts of the present apparatus.

According to my invention, a plate 10 is secured across the end 12 of the supporting structure of the conveyor 8 adjacent the outer end of the conveyor 6 by means of suitable brackets or straps 14. The plate 10 is of a length substantially corresponding to the width of the conveyors 6 and 8, and is preferably supported even with the tops of the conveyors 6 and 8, whereby a wax slab being moved from the conveyor 6 to the conveyor 8 will be passed over and in contact with the plate 10. The leading edge 16 (Fig. 2) of the plate 10 is preferably turned downwardly to prevent the exposure of a sharp edge to a wax slab being moved over the plate. The trailing edge 18 of the plate 10 is turned downwardly and bolted to a downwardly extending trough or the like 20. The trough 20 may be easily formed out of a flat sheet of material cut into a triangular shape, with the opposite edges 22 of the plate turned to form flanges and form the plate into a somewhat funnel shape. Also, the trough 20 is preferably slanted a few degrees from the vertical to provide a drain for melted wax, as will be more fully hereinafter set forth.

I prefer to form the plate 10 out of a relatively thin sheet of copper in order that the plate will have a high coefficient of heat transfer. If desired, the plate 10 can be supported on the brackets 14 by a suitable insulating sheet or board 24.

The plate 10 is preferably heated by a pair of strip type heaters 26 extending underneath the plate 10 adjacent the leading and trailing ends of the plate. I have found that 230 volt, 600 watt chromalox strip heaters may be effectively used for heating the plate 10. However, it is to be understood that any type of heating means may be used, such as a steam jacketed heater (not shown), so long as the plate 10 is heated to a temperature above the melting temperature of the slab material. The heaters 26 are connected to a suitable source of electrical energy through, and are controlled by, a suitable thermo-switch 28 in a manner well known in the art. The switch 28 may be set as desired to control the upper and lower temperature limits of the heaters 26 and provide a close control of the temperature of the plate 10. The entire heater assembly, comprising the heaters 26 and the switch 28, may be suitably secured under the plate 10 by means of supporting bolts and a strip of insulating material 30, whereby none of the heater assembly will be exposed to melted wax, or be in the way of any of the slabbing operations.

As previously indicated, the wax slabs 5 are moved over the plate 10 between the conveyors 6 and 8. The hold-down mechanism 32 which I prefer to use for moving the slabs over the plate 10 comprises a transversely extending shaft 34 journalled at its opposite ends in brackets 36 extending upwardly from the outer end of the conveyor 6. It will be understood that the brackets 36 may be secured on the supporting structure of the conveyor 6 in any desired manner, so long as the shaft 34 is well above any slabs which may be moved along and off of the end of the conveyor 6. One end of the shaft 34 has a sheave 38 rigidly secured thereon to receive an endless belt 40 extending from a roller 42 of the conveyor 8. The roller 42 is operated by the conveyor 8 to drive the belt 40 and sheave 38, whereby the shaft 34 is operated. In the combination shown, the roller 42 will be rotating clockwise (when viewed from the near side of the machine as shown in Fig. 1) and the shaft 34 will be simultaneously rotated counter-clockwise.

A pair of side arms 44 are secured loosely over the ends of the shaft 34 and extend horizontally from the shaft 34 over the plate 10. The arms 44 are loosely telescoped over the shaft 34, whereby the arms can be maintained in a horizontal position during rotation of the shaft 34. A pair of braces 46 extend between and are secured to the arms 44 to retain the arms in their desired spaced relationship. Another transversely extending shaft 48 is journaled in the ends of the arms 44 in spaced relation to the shaft 34. Two pairs of mating sheaves 50 are secured in transversely spaced relation on the shafts 34 and 48 to receive a pair of driving belts 52. It will thus be seen that the belts 52 will be spaced transversely above the plate 10 and will be driven upon operation of the conveyor 8 and shaft 34. It is preferred that the lower portions of the belts 52 extend below the side arms 44, whereby only the belts 52 will be in contact with a slab 5 resting on the plate 10. The free end of the hold-down mechanism 32 (the end adjacent the shaft 48) may be suspended by a chain or the like (not shown) from the machine 4, such that the weight of the mechanism 32 will be imposed on a slab lying on the plate 10, yet the mechanism 32 will not pivot downwardly onto the conveyor 8 or the plate 10 when a slab is not being moved thereunder.

In operation, wax slabs or the like 5 formed in the machine 4 are dumped onto the conveyor 6, with the feather edges 5a of the slabs extending downwardly. Assuming the conveyors 6 and 8 are in operation, the slabs will be moved along the conveyor 6 away from the discharge end of the machine 4. The conveyor 6 transports each slab onto the leading edge 16 of the plate 10, whereupon the belts 52 contact the top surface of the slab and slides the slab over the plate 10 onto the conveyor 8. As previously noted, the plate 10 is preferably installed flush with the tops of the conveyors 6 and 8, whereby the slabs will be moved substantially horizontally from the conveyor 6 to the conveyor 8.

The belts 52 slide the slabs 5 over the plate 10 in succession, with the feather edges 5a of the slabs being in contact with the plate. It will be apparent that when the plate 10 is heated to a temperature above the melting temperature of the slab material, the feather edges 5a will be melted during progression of the slabs over the plate. The temperature of the plate 10 may be easily correlated with the speed of movement of the slabs over the plate, whereby only the feather edges of the slabs will be melted. The melted wax or the like is moved across the plate 10 and drains by gravity over the trailing edge 18 of the plate into the trough 20, whereby the melted wax may be recovered and subsequently used in slabbing operations.

The slabs moved onto the conveyor 8 will have even edges on all sides, whereby all sides of the slab will be flat to facilitate subsequent handling of the slabs. As previously indicated, the slabs moved off of the far end (not shown) of the conveyor 8 are loaded and conveyed away in any desired manner.

From the foregoing it will be apparent that the present invention materially facilitates slabbing operations, whereby the completed slabs may be easily handled and transported. All feather edges formed on the slabs during molding of the slabs are automatically removed upon discharge of the slabs from the molding machine. The apparatus is simple in construction, and the energy requirements for heating the plate used in melting the feather edges will be relatively small to provide an economically operating apparatus.

Changes may be made in the combination and arrangement of parts or elements set forth in the specification and shown in the drawings without departing from the spirit and scope of the invention as defined in the following claims.

I claim:

1. In combination with a machine for molding slabs of wax: a first continuous conveyor means at the discharge end of said machine; a plate of metallic heat-conducting material at the discharge edge of said conveyor means and aligned therewith; a heating means for heating said plate; a second continuous conveyor means at the discharge edge of the plate and aligned therewith; and a set of belts drivingly connected to the second conveyor means and positioned above the plate adapted to move molded slabs of wax from said first conveyor means across said plate to said second conveyor means.

2. In combination with a machine for molding slabs of wax or the like: a first conveyor at the discharge end of the machine for conveying the slabs from the machine; a second conveyor extending in tandem relation to said first conveyor; a metallic heat-conducting plate secured across the end of said first conveyor between said first conveyor and said second conveyor, the upper surface of said plate being flush with the transporting surface of said conveyors; means for sliding the slabs across said plate, said means comprising a set of belts drivingly connected to said second conveyor and positioned so as to contact the slabs as they reach the end of said first conveyor; and a heater for heating said plate.

3. The combination as defined in claim 2 wherein the leading edge of said plate is turned downwardly.

References Cited in the file of this patent

UNITED STATES PATENTS

| | | |
|---|---|---|
| 1,952,038 | Fischer | Mar. 20, 1934 |
| 2,126,869 | Burchenal et al. | Aug. 16, 1938 |
| 2,360,275 | Rau | Oct. 10, 1944 |
| 2,403,644 | Emmer | July 9, 1946 |
| 2,460,566 | Brown et al. | Feb. 1, 1949 |
| 2,463,650 | Snyder et al. | Mar. 8, 1949 |
| 2,647,282 | Schroeder | Aug. 4, 1953 |
| 2,761,803 | Breitenbach | Sept. 4, 1956 |
| 2,776,451 | Chavannes | Jan. 8, 1957 |